(12) United States Patent
Trygg et al.

(10) Patent No.: US 7,322,231 B2
(45) Date of Patent: Jan. 29, 2008

(54) FLOWMETER OF A VARIABLE ORIFICE TYPE HAVING A CLEANING ARRANGEMENT

(75) Inventors: Hannu Trygg, Jyväskylä (FI); Harri Makkonen, Muurame (FI)

(73) Assignee: John Crane Safematic Oy, Muurame (FI)

( * ) Notice: Subject to any disclaimer, the term of this patent is extended or adjusted under 35 U.S.C. 154(b) by 79 days.

(21) Appl. No.: 11/374,102

(22) Filed: Mar. 14, 2006

(65) Prior Publication Data

US 2006/0230842 A1    Oct. 19, 2006

(30) Foreign Application Priority Data

Mar. 16, 2005  (FI) .................................. 20055119

(51) Int. Cl.
*G01F 3/14*   (2006.01)
(52) U.S. Cl. ...................................................... 73/250
(58) Field of Classification Search ..................... None
See application file for complete search history.

(56) References Cited

U.S. PATENT DOCUMENTS

| | | | |
|---|---|---|---|
| 3,640,430 A | * | 2/1972 | Roberts .......................... 222/1 |
| 3,691,835 A | * | 9/1972 | Metzger ................... 73/861.55 |
| 3,941,861 A | * | 3/1976 | Hamalainen et al. ......... 261/19 |
| 4,093,545 A | * | 6/1978 | Cullis ........................... 210/86 |
| 5,086,654 A | | 2/1992 | Malminen |
| 5,515,734 A | | 5/1996 | Malminen |
| 5,924,446 A | | 7/1999 | Ikonen et al. |
| 6,119,528 A | * | 9/2000 | Genack .................... 73/861.12 |

FOREIGN PATENT DOCUMENTS

| | | |
|---|---|---|
| DE | 30 15 421 A1 | 10/1981 |
| FI | 944151 | 3/1996 |
| GB | 900 006 | 7/1962 |
| JP | 2000-292226 | 10/2000 |

\* cited by examiner

*Primary Examiner*—Harshad Patel
(74) *Attorney, Agent, or Firm*—Barnes & Thornburg, LLP

(57) ABSTRACT

The invention relates to a flowmeter for regulating and monitoring the flow of sealing fluid to be conducted to a seal of a rotating shaft, the meter including a sealing fluid metering channel, a sealing fluid inlet, and a connection towards the seal for regulating the flow of sealing fluid, a non-return valve for preventing the sealing fluid from flowing back to the flowmeter, a regulating and monitoring mechanism, whereby the sealing fluid flows through the opening, and a cleaning mechanism, which is movable by an actuator. The non-return valve is arranged as an extension of the metering channel at the meter outlet side end, coaxially with the metering channel, whereby the metering cone is in mechanical contact with the non-return valve, and thus it is also possible to clean the non-return valve with the cleaning mechanism.

13 Claims, 4 Drawing Sheets

Figure 6:
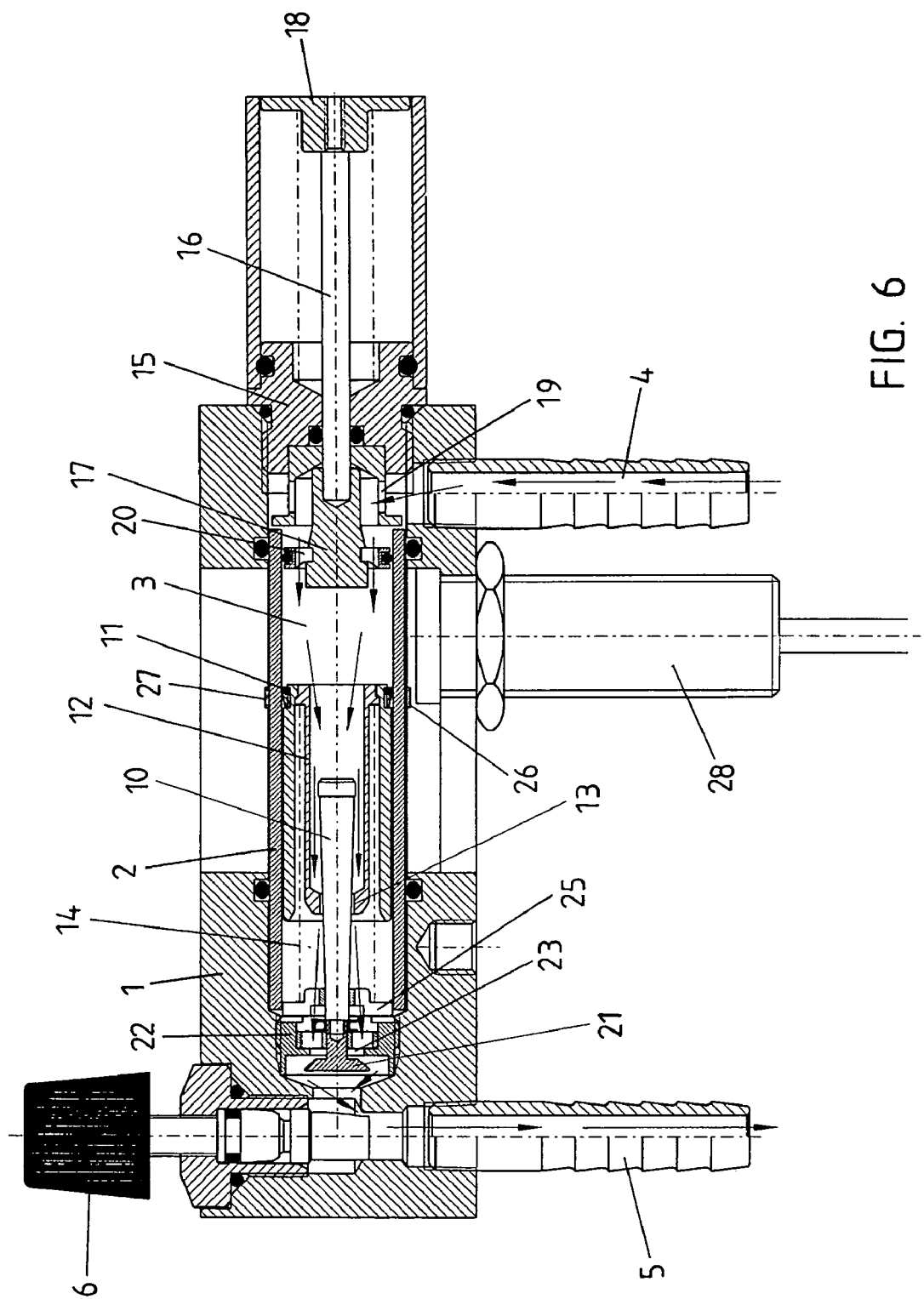

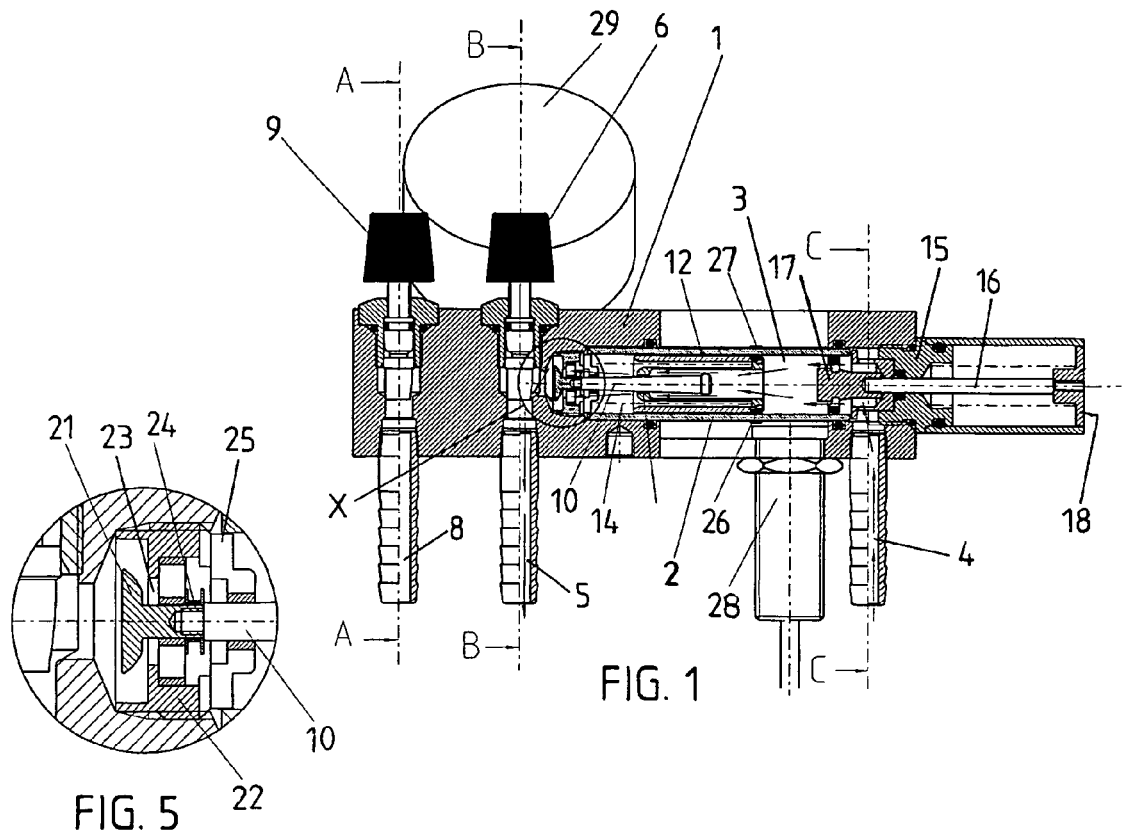
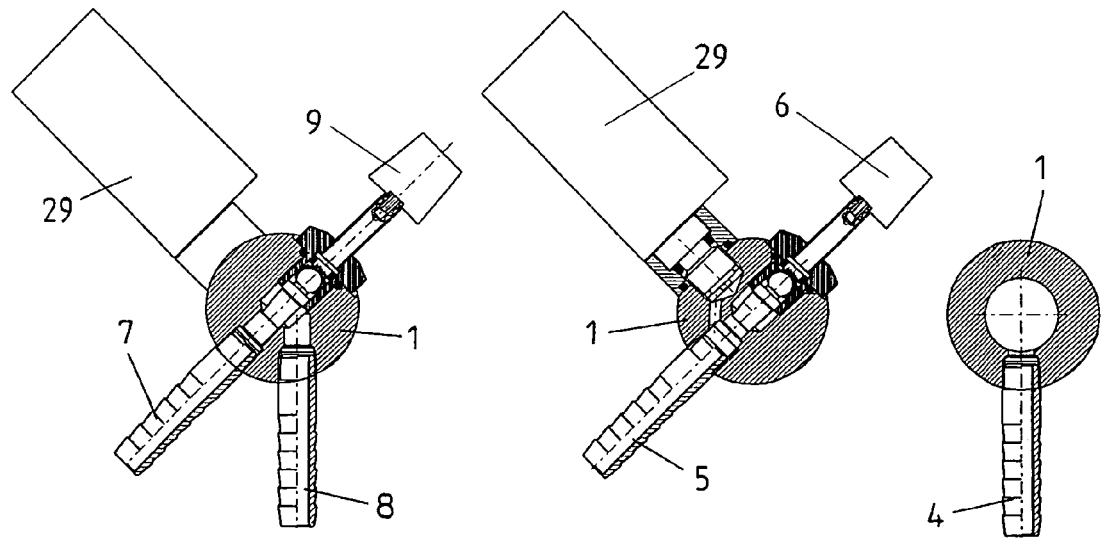

FLOWMETER OF A VARIABLE ORIFICE TYPE HAVING A CLEANING ARRANGEMENT

BACKGROUND OF THE INVENTION

The invention relates to a flowmeter for regulating and monitoring the flow of sealing fluid to be conducted to a seal of a rotating shaft, the meter comprising a body, a sealing fluid metering channel arranged in the body, a sealing fluid inlet on a first end side of the metering channel and a sealing fluid connection towards the seal on a second end side of the metering channel, a control valve for regulating the flow of sealing fluid, a non-return valve for preventing the sealing fluid from flowing back to the flowmeter, a regulating and monitoring mechanism comprising a metering cone placed in the metering channel and metering the flow of the sealing fluid, the cross section of the cone tapering in the flow direction, a float movably arranged in the metering channel about the control cone, the float having an opening for the metering cone, and a spring placed in the metering channel and acting against the flow direction on the float, the sealing fluid flowing through the opening between the float and the metering cone, and a cleaning means which is placed in the metering channel between the float and the metering channel inlet side end to extend to the inner surface of the metering channel and which is movable in the metering channel by means of actuating means extending outside the metering channel.

A flowmeter of this kind is used, for instance, in pulp and paper industries, chemical industry, oil and gas industries and food industry, in monitoring seals that are typically plait gaskets or mechanical rotary seals. It is the function of the sealing fluid to lubricate the seal's sliding surfaces and to extract extra heat from the seal. The sealing fluid to be used is generally water.

Prior art flowmeters are manufactured such that the meter itself and its cleaning actuator which enables the meter's volume flow indication area to be cleaned, are integrated in a plastic body. There exist various options for cleaning methods: those to be pressed, pulled or based on reciprocating movement. Likewise, there are metering cones of different types: a conventional rotameter model, one provided with a buoyant float, a spring-loaded float with a metering cone in the middle thereof, a spring-loaded float with a cone machined in the cylinder hole thereof, a spring-loaded float and a cone fixedly secured to the cleaning means (e.g. see Finnish patent 100360). Known meters also comprise a non-return valve that is integrated with the body. A throttling area and an indication area of a spring-loaded float metering the flow are typically arranged in the same end of the float.

A problem with the flowmeters is that when a seal failure has occurred, industrial product to be treated starts flowing in the vicinity of the seal towards the flowmeter connection to the seal. This industrial product is liquid that may contain acids, bases and various particles. In known flowmeters, such as the one set forth in the above Finnish patent, a non-return valve is placed apart from the metering channel, generally in connection with the sealing fluid connection to the seal such that the motion of the non-return valve is perpendicular to the components in the metering channel. Particles in the industrial fluid that flow to the non-return valve through the connection towards the seal clog and jam it. When the non-return valve is jammed, the seal remains without sealing fluid, and consequently lubrication and cooling thereby is defective. Sooner or later the seal fails. When the seal failure is detected, the damaged seal is replaced by a new one, but the non-return valve clogged with particles from the industrial fluid will not necessarily be cleaned, and therefore the clogged valve prevents sealing fluid's access to the seal and hence the new seal will also get damaged. Generally, it is not until that a flowmeter function failure is detected, and thereafter the flowmeter will be disassembled and the non-return valve cleaned.

In addition, the known non-return valves are often made of rubber or plastic, whereby failure through acids or high temperature poses a great risk to safety. Moreover, the non-return valves require a light pressure to open, which causes pressure loss in the flowing fluid. This problem is obvious particularly in plants having low sealing water pressures. Currently it is possible for industry to use condensation water, for instance, as the sealing fluid, whereby the temperature and the pressure of the sealing fluid may be high.

SUMMARY OF THE INVENTION

The object of the invention is to eliminate the above-described problems. This is achieved with a flowmeter according to the invention, which is characterized in that a non-return valve is arranged as an extension to a metering channel at the meter outlet side end, coaxially with the metering channel, and that the metering cone is in mechanical contact with the non-return valve.

When the non-return valve is placed in connection with the metering channel in alignment therewith, the cleaning means, with which only the inner surface of the metering channel was previously cleaned, mainly at the indication area thereof, can be provided such that also the clogged non-return valve can be opened for clearing it from the sealing fluid flow. Thus, the cleaning means with its actuator constitutes a completely independent whole, which can be contacted also with the metering cone head to open the non-return valve, and consequently by moving the cleaning means in the metering channel both the inner surface of the metering channel and the non-return valve can be cleaned.

The non-return valve may get clogged also in normal use preventing the sealing fluid from flowing to the seal. In that case an inductive lower limit alarm of the flow, which is advantageously placed in the vicinity of the metering channel pipe and which monitors that the float stays out of its reading area, gives an alarm before the flow ends completely. Thus the maintenance person has sufficiently time to clean the meter in time.

Pressure loss in the flowmeter of the invention is lower than in prior art structures, even though the non-return valve is open, because the flowing fluid need not separately open the non-return valve. The force opening the non-return valve is generated from the pressure difference between the metering cone and the float, which is utilized through mechanical contacts for opening the non-return valve. Hence the total pressure loss in the flowmeter reduces and the flowmeter can be used at low sealing fluid pressures.

In addition the above-mentioned mechanical contact makes sure that when sealing fluid flow passes from the flowmeter to the seal, the metering cone presses the non-return valve open. This ensures that the non-return valve stays open whenever sealing fluid flows past the metering cone.

The flowmeter can now be employed in conditions where temperatures and pressures of the sealing fluid are high (for instance condensation waters), because the meter can advantageously be made of metal (apart from the metering channel, which is made of transparent material, such as glass or plastic pipe, for readability). The meter can be employed in higher temperatures and pressures than before, i.e., it is suitable for more demanding uses than before.

In the solution of the invention the metering cone may be the same for different flow ranges. Different flow ranges may be implemented by different float springs, i.e., by changing the spring force. Thus the manufacturing costs will be lower than before even in this respect.

LIST OF DRAWINGS

Figure 7:
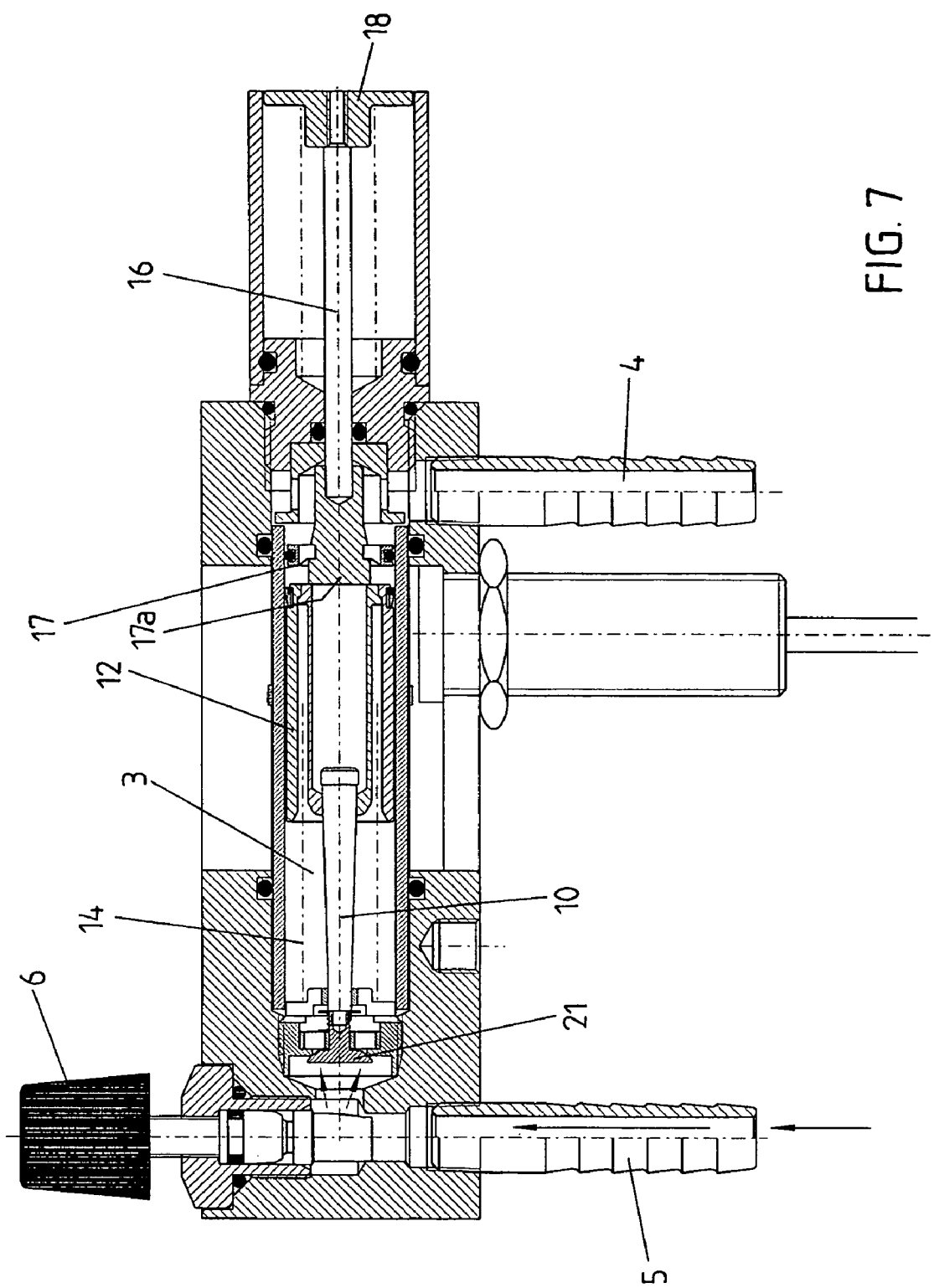
Figure 8:
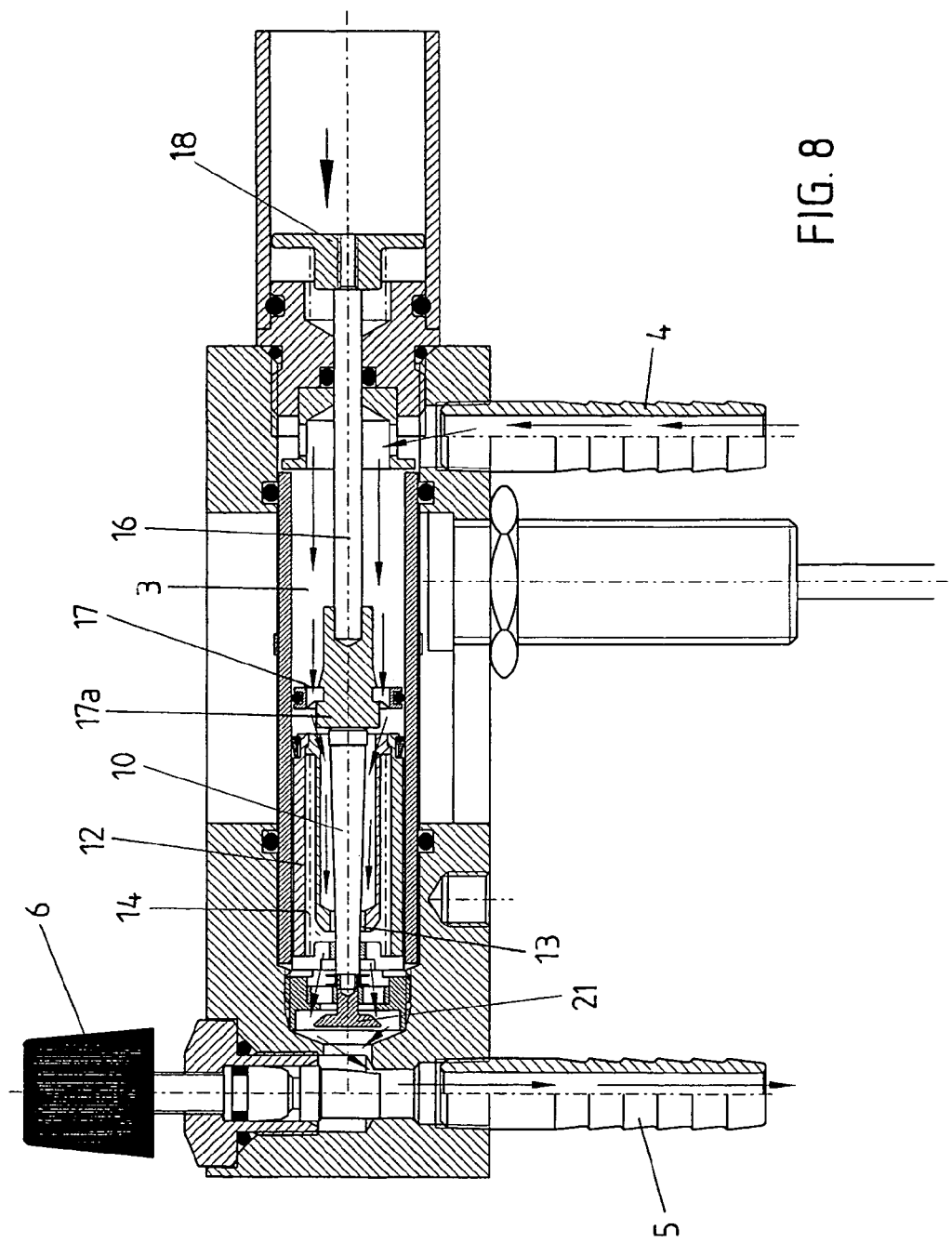

In the following the invention will be described in greater detail in connection with one preferred embodiment with reference to the attached drawings, wherein FIG. 1 shows a cross section of a flowmeter according to the invention, FIG. 2 is a section A to A of FIG. 1, FIG. 3 is a section B to B of FIG. 1, FIG. 4 is a section C to C of FIG. 1, FIG. 5 is an enlargement of area X of FIG. 1, FIG. 6 is the flowmeter of FIG. 1 in a larger scale and in a somewhat simplified manner, in a normal flow situation, FIG. 7 shows a situation, in which the non-return valve of the flowmeter of FIG. 6 is clogged, and FIG. 8 illustrates the cleaning stage of the flowmeter clogged in the manner shown in FIG. 7.

DETAILED DESCRIPTION OF THE INVENTION

With reference to the drawings the flowmeter of the invention for regulating and monitoring a flow of sealing fluid to be conducted to a seal (not shown) of a rotating shaft (not shown) comprises an advantageously cylindrical body 1 of plastic or metal, in the cylindrical drilled bore of which there is mounted a cylindrical metering pipe 2 of plastic or glass, whose interior constitutes a metering channel 3 of sealing fluid. A sealing fluid inlet 4 is located on a first end side of the metering channel and a sealing fluid connection 5 to the seal is located on a second end side of the metering channel. In connection with an outlet 5 there is a control valve 6 for regulating the flow of sealing fluid. The device also comprises an inlet 7 for sealing fluid coming from the seal and a sealing fluid outlet 8, and in connection with the inlet 7 there is arranged a pressure regulating valve 9 for regulating the pressure of the sealing fluid in the seal (FIGS. 1 and 2). All the above connections 4, 5, 7 and 8 are typically positioned perpendicularly to the longitudinal axis of the body 1 and the metering channel 3.

In the metering channel 3 there is placed a regulating and monitoring mechanism that comprises a sealing fluid flow metering cone 10 which tapers in cross section in the flow direction, a float 12 that is movably arranged around the metering cone 10, sealed against the inner surface of the metering channel with a seal 11 and having a round opening 13 in the middle for the metering cone 10, and a spring 14 acting against the flow direction on the float 12, whereby the sealing fluid flows through the opening 13 between the float 12 and the metering cone 10.

In the drilled bore of the flowmeter body, in succession to the metering pipe 2, there is mounted a cleaning device that comprises a mounting frame 15 screwed fast to said drilled bore, a shaft 16 that is axially movable and installed in a centralized and sealed manner to the mounting frame, at a first end, extending to the metering channel 3, of which shaft there is connected a cleaning means 17 extending to the inner surface of the metering channel 3, and at a second end, extending outside the flowmeter, there is arranged a cleaning actuator 18. In addition the mounting frame 15 and the cleaning means 17 comprise openings 19 and 20 that allow the sealing fluid to flow therethrough.

To prevent the sealing fluid from flowing back towards the flowmeter, the flowmeter also comprises a non-return valve 21, whose position and structure are the most substantial features to the invention.

It is substantial that the non-return valve 21 is arranged to form an extension to the metering channel 3 at the flowmeter end on the outlet side, coaxially to the metering channel 3, in a manner that allows the metering. cone 10 to come into mechanical contact with the non-return valve 21, whereby the non-return valve 21 can also be cleaned with the cleaning device 15 to 18 in the manner to be described below.

The non-return valve 21 is placed in a separate valve body 22 which is arranged on the bottom of the drilled bore of the body 1. The valve body 22 is provided with flow-through channels 23 that the non-return valve is arranged to open or close in order to allow the sealing fluid flow to the outlet 5. Between the non-return valve 21 and the metering cone 10, or the non-return valve 21 and its body 22, there is arranged a valve spring 24, whereby the opening and closing of the non-return valve takes place controllably (FIG. 3).

The metering cone 10 and the non-return valve 21 may be fixedly interconnected, or detached from one another. If the non-return valve 21 is not connected to the metering cone 10, a guiding part 25 is connected to its end, which guiding part is supported to the inner wall of the metering channel 3. In that case the metering cone 10, the float 12, the spring 14 and the guiding part 25 also constitute a specific, detached subassembly that is located in the metering channel 3.

By suitably dimensioning and designing the cleaning means 17 of the cleaning device (or in this case rather its mid-portion 17a, by which it is connected to the shaft 16) it may be contacted also to the metering cone 10 head so as to open the non-return valve 21, and consequently by moving the cleaning means 17 in the metering channel both the inner surface of the metering channel 3 and the non-return valve 21 can be cleaned. It is possible to push the non-return valve 21 open with the mid-portion 17a of the cleaning means 17, when the metering cone 10 pushes out from the float 12 that rests against the bottom of the metering channel 3, or if the mid-portion 17a of the cleaning means may penetrate inside the float 12. The cleaning device 15 to 18 also constitutes a completely independent whole in the earlier described manner.

In the metering pipe 2 there is also arranged an indicator 26 of sealing fluid flow volume and an indicator 27 of flow control value. In that case it is appropriate that in the vicinity of the metering pipe 2 there is also arranged an inductive lower limit alarm of flow 28, which monitors that the float 12 stays out of its reading area. Nevertheless, if that happens, the alarm goes off. In connection with the sealing fluid connection towards the seal there is advantageously a space for a pressure gauge 29.

The operation and the cleaning of the flowmeter according to the invention may be briefly described as follows:

FIGS. 1 and 6 show a normal sealing fluid flow situation, where the sealing fluid entering the metering channel 3 through the sealing fluid inlet 4 flows between the float 12 and the metering cone 10, and pressure loss caused therebetween opens the non-return valve 21 through mechanical action of the metering cone, whereby the sealing fluid may flow past the non-return valve 21 to the connection 5 towards the seal.

FIG. 7, in turn, shows a situation, where the seal to be lubricated with the sealing fluid is damaged and sealing fluid has begun to flow towards the flowmeter through the connection 5 towards the seal. The non-return valve 21 then closes and thus prevents the sealing fluid from entering further in the meter. However, as a result of the seal failure impurities appear in the sealing fluid and they accumulate in the non-return valve 21.

FIG. 8 shows how the situation presented in the figure is redressed by means of the cleaning device 15 to 18. By pressing the cleaning actuator 18 the cleaning means moves in the metering channel 3 cleaning its inner wall and finally pushing the non-return valve 21 open as the cleaning means 17 comes into contact with the metering cone 10. The flowing sealing fluid can then clean the non-return valve 21. The actuator 18 is pressed several times, which ensures complete cleaning.

The above description of the invention in only intended to illustrate the basic idea of the invention. The invention is thus not restricted to the described embodiment, but a person skilled in the art may implement the details of the invention in a variety of ways within the scope of the accompanying claims.

The invention claimed is:

1. A flowmeter for regulating and monitoring the flow of sealing fluid to be conducted to a seal of a rotating shaft, the meter comprising a body, a sealing fluid metering channel arranged in the body, a sealing fluid inlet on a first end side of the metering channel and a sealing fluid connection towards the seal on a second end side of the metering channel, a control valve for regulating the flow of sealing fluid, a non-return valve for preventing the sealing fluid from flowing back to the flowmeter, a regulating and monitoring mechanism comprising a metering cone placed in the metering channel and metering the flow of the sealing fluid, the cross section of the cone tapering in the flow direction, a float movably arranged in the metering channel about the metering cone, the float having an opening for the metering cone, and a spring placed in the metering channel and acting against the flow direction on the float, the sealing fluid flowing through the opening between the float and the metering cone, and a cleaning means which is placed in the metering channel between the float and the metering channel inlet side end to extend to the inner surface of the metering channel and which is movable in the metering channel by means of actuators extending outside the metering channel, wherein the non-return valve is arranged as an extension to the metering channel at the meter end on the side of the connection to the seal, co-axially with the metering channel, and that the metering cone is in mechanical contact with the non-return valve.

2. The flowmeter of claim 1, wherein the non-return valve is placed in a separate valve body having a flow-through channel which the non-return valve is arranged to open or close and that a valve spring is arranged between the non-return valve and the metering cone.

3. The flowmeter of claim 1, wherein the metering cone and the non-return valve are fixedly interconnected.

4. The flowmeter of claim 1, wherein the metering cone is detached from the non-return valve.

5. The flowmeter of claim 4, wherein in the head of the metering cone there is connected a guiding part that is supported to the inner wall of the metering channel.

6. The flowmeter of claim 5, wherein the metering cone, the float, the valve spring and the guiding part constitute a specific subassembly that is located detached in the metering channel.

7. The flowmeter of claim 1, wherein the cleaning means with its actuators constitutes a completely independent whole which can be contacted also to the head of the metering cone for opening the non-return valve, and thus by moving the cleaning means in the metering channel both the inner surface of the metering channel and the non-return valve can be cleaned.

8. The flowmeter of claim 1, wherein the metering channel is formed of a glass or plastic pipe.

9. The flowmeter of claim 8, wherein in the metering pipe there is arranged an indicator of sealing fluid flow volume and an indicator of flow control value.

10. The flowmeter of claim 8 or 9, wherein in the vicinity of the metering pipe there is arranged an inductive lower limit alarm of flow, which monitors that the float stays out of its reading area.

11. The flowmeter of claim 1, wherein there is a sealing fluid inlet from the seal and an outlet for the sealing fluid and that in connection with the inlet from the seal there is arranged a pressure control valve for regulating the sealing fluid pressure.

12. The flowmeter of claim 1, wherein the flowmeter is provided with a pressure gauge.

13. The flowmeter of claim 12, wherein the flow regulating valve and the pressure gauge are placed in connection with a sealing fluid connection to the seal.

* * * * *